United States Patent
Slater

(10) Patent No.: US 9,619,652 B2
(45) Date of Patent: Apr. 11, 2017

(54) SYSTEM, METHOD AND COMPUTER PROGRAM PRODUCT FOR DETERMINING A RISK SCORE FOR AN ENTITY

(75) Inventor: Steve Slater, Alamo, CA (US)

(73) Assignee: salesforce.com, inc., San Francisco, CA (US)

( * ) Notice: Subject to any disclaimer, the term of this patent is extended or adjusted under 35 U.S.C. 154(b) by 135 days.

(21) Appl. No.: 12/917,400

(22) Filed: Nov. 1, 2010

(65) Prior Publication Data

US 2011/0247069 A1 Oct. 6, 2011

Related U.S. Application Data

(60) Provisional application No. 61/319,788, filed on Mar. 31, 2010.

(51) Int. Cl.
| | |
|---|---|
| G06F 11/00 | (2006.01) |
| G06F 12/14 | (2006.01) |
| G06F 12/16 | (2006.01) |
| G06F 21/57 | (2013.01) |
| G06F 21/62 | (2013.01) |
| G06Q 10/06 | (2012.01) |

(52) U.S. Cl.
CPC ............ *G06F 21/577* (2013.01); *G06F 21/62* (2013.01); *G06Q 10/0635* (2013.01)

(58) Field of Classification Search
CPC ........... G06Q 10/0635; G06Q 20/4016; G06Q 40/06; G06F 21/577; H04L 63/1416; H04L 63/1408; H04L 63/145
See application file for complete search history.

(56) References Cited

U.S. PATENT DOCUMENTS

| | | |
|---|---|---|
| 5,577,188 A | 11/1996 | Zhu et al. |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

OTHER PUBLICATIONS

U.S. Appl. No. 60/828,192, filed Oct. 4, 2006.
salesforce.com, Salesforce CRM Security Audit Guide, Apr. 2009 (14 pages).

*Primary Examiner* — Joshua Joo
*Assistant Examiner* — Younes Naji
(74) *Attorney, Agent, or Firm* — Meyertons, Hood, Kivlin, Kowert & Goetzel, P.C.

(57) ABSTRACT

In accordance with embodiments, there are provided mechanisms and methods for determining a risk score for an entity. These mechanisms and methods for determining a risk score for an entity can enable more effective monitoring of a system, can create more relevant data associated with the entity, etc.

17 Claims, 4 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,377,810 B1* | 4/2002 | Geiger ............... H04L 63/123 342/357.4 |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 7,805,415 B1* | 9/2010 | Flesher ............... H04L 63/12 707/694 |
| 8,015,495 B2 | 9/2011 | Achacoso et al. |
| 8,041,584 B2* | 10/2011 | Wu ............... G06Q 40/08 600/300 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 8,745,698 B1* | 6/2014 | Ashfield ............... H04L 63/08 726/26 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233325 A1* | 12/2003 | Belyi ............... G06Q 20/108 705/42 |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0221176 A1* | 11/2004 | Cole ............... G06F 21/577 726/25 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0125295 A1* | 6/2005 | Tidwell ............... G06Q 20/042 705/16 |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0206834 A1 | 9/2006 | Fisher et al. |
| 2008/0010243 A1 | 1/2008 | Weissman et al. |
| 2008/0086342 A1* | 4/2008 | Curry ............... G06Q 40/025 705/38 |
| 2008/0249972 A1 | 10/2008 | Dillon |
| 2008/0288330 A1* | 11/2008 | Hildebrand ............... G06Q 10/06 705/7.28 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0178142 A1* | 7/2009 | Lieblich ............... G06F 21/316 726/25 |
| 2010/0153604 A1* | 6/2010 | Peacock ............... G06F 9/4843 710/260 |
| 2010/0174918 A1* | 7/2010 | Hoffman ............... G06F 21/6218 713/189 |

(56) References Cited

U.S. PATENT DOCUMENTS

| | | | |
|---|---|---|---|
| 2010/0262444 A1* | 10/2010 | Atwal | G06Q 40/025 705/38 |
| 2010/0286994 A1* | 11/2010 | Tebbs | G06F 19/00 705/2 |
| 2011/0191200 A1* | 8/2011 | Bayer | G06Q 20/12 705/26.1 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |

* cited by examiner

SYSTEM, METHOD AND COMPUTER PROGRAM PRODUCT FOR DETERMINING A RISK SCORE FOR AN ENTITY

CLAIM OF PRIORITY

This application claims the benefit of U.S. Provisional Patent Application 61/319,788, entitled "Method and system for performing security risk analysis in an on-demand service," by Steve Slater, filed Mar. 31, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data security, and more particularly to determining a risk score associated with data security.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional systems, it may be desirable to monitor the access of data within such systems. Unfortunately, conventional monitoring systems have been associated with various limitations. Just by way of example, due to the fact that many different entities associated with a system may each have different levels of access within that system, and may therefore access a multitude of different elements within the system, conventional monitoring systems may not have an appropriate amount of resources needed to monitor each of these entities within the system. Accordingly, it is desirable to provide techniques that improve the ability to effectively monitor a system.

BRIEF SUMMARY

In accordance with embodiments, there are provided mechanisms and methods for determining a risk score for an entity. These mechanisms and methods for determining a risk score for an entity can enable more effective monitoring of a system, can create more relevant data associated with the entity, etc.

In an embodiment and by way of example, a method for determining a risk score for an entity is provided. In one embodiment, one or more parameters associated with an entity's access to data are identified. Additionally, a risk associated with the entity is determined, based on the one or more parameters. Further, one or more actions are performed, utilizing the risk associated with the entity.

While one or more implementations and techniques are described with reference to an embodiment in which enabling an aspect required with respect to code to be installed within a multi-tenant on-demand database system is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for determining a risk score for an entity.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for determining a risk score for an entity will be described with reference to example embodiments.

Figure 1:
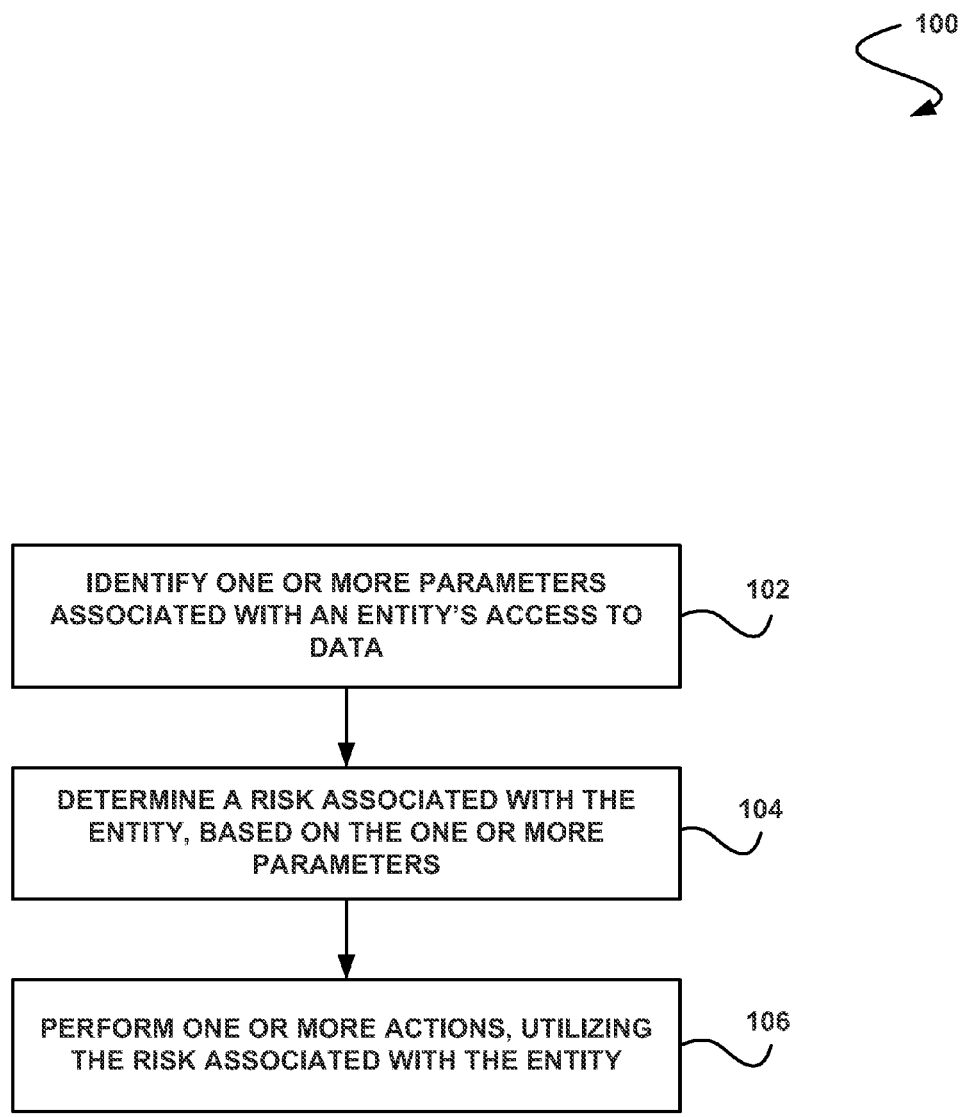
FIG. 1 illustrates a method for determining a risk score for an entity, in accordance with one embodiment.

FIG. 1 illustrates a method 100 for determining a risk score for an entity, in accordance with one embodiment. As shown in operation 102, one or more parameters associated with an entity's access to data are identified. With respect to the present description, the data may include any information (e.g., one or more files, objects, etc.) that is capable of being accessed within a system (e.g., one or more client and/or server computer systems, a database system, an on-demand multi-tenant database system, etc.). In one embodiment, the data may include confidential data. For example, the data may include private customer data, protected health data, confidential financial data, sensitive data, private information, etc.

Additionally, in another embodiment, the entity may include a user of a system. For example, the entity may include an end user, client, etc. of the system. In another example, the entity may include an administrator of the system. In yet another example, the entity may include a guest on the system. In still another example, the entity may include an individual, a group, an organization, etc.

Further, in yet another embodiment, the one or more parameters associated with the entity's access to data may include a level of access assigned to the entity. For example, the level of access may include a particular level of security access within the system. In another example, the level of access may dictate a particular type of data on the system that the entity is allowed to access (e.g., one or more types of files on the system, etc.), data within a particular location on the system that the entity is allowed to access, etc. In addition, in still another embodiment, the one or more parameters may include a privilege level of the entity. For example, the entity may have an administrator privilege level within the system, a non-administrator privilege level within the system, etc.

Further still, in one embodiment, the one or more parameters may include one or more permissions granted to the entity. For example, the entity may be granted permission to access particular data within the system. In another embodiment, the one or more permissions granted to the entity may include one or more temporary permissions (e.g., a permission that expires after a predetermined amount of time, a permission that expires after a predetermined amount of access has been performed, etc.). In yet another embodiment, the one or more parameters may include a location of the entity (e.g., a physical location of the entity, an Internet protocol (IP) address of the entity, etc.).

Also, in another embodiment, the one or more parameters may include a history of actions taken by the entity within the system. For example, the parameters may include a login history of the entity (e.g., how many times the entity logged in to the system over a predetermined amount of time, etc.), a data access history of the entity (e.g., what data the entity accessed over a predetermined amount of time, etc.), etc. In yet another embodiment, the one or more parameters may include one or more data sharing rules assigned to the entity. For example, the entity may be allowed to share one or more data elements with another entity (e.g., create a permission to access data, grant a permission to access data, etc.).

In still another embodiment, the one or more parameters may include an ability for the entity to manually share data. Also, in another embodiment, the one or more parameters may include one or more elements of access or privileges that may cross roles, functional responsibilities, geographic factors, or other types of categories or territories.

Further, in one embodiment, the one or more parameters may be identified by monitoring the entity's actions (e.g., within the system, etc.). In another embodiment, the one or more parameters may be determined by an administrator of the system. In another embodiment, the one or more parameters may be determined by a customer of the system. Of course, however, the one or more parameters may be identified in any manner.

Additionally, it should be noted that, as described above, the multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further, as shown in operation 104, a risk associated with the entity is determined, based on the one or more parameters. In one embodiment, the risk associated with the entity may include a risk score of the entity. For example, the risk score for the entity may be determined by one or more algorithms/formulas (e.g., risk scoring algorithms, etc.) based on the one or more parameters. In another embodiment, a user may create one or more additive rules based on the one or more algorithms/formulas that may be used in conjunction with the one or more algorithms/formulas to determine the risk score. In this way, an increase or decrease in the one or more parameters associated with the entity's access to data may be accounted for. In yet another embodiment, the risk score may include one or more numbers, letters, colors, or any other element that conveys a level of risk associated with the entity.

In still another embodiment, an algorithm may be selected from one or more algorithms to determine the risk score for the entity based on one or more factors. For example, an algorithm may be associated with one or more specific issues (e.g., data loss, data theft, insider trading, etc.) and may be selected from one or more algorithms to determine the risk score for the entity based on a particular issue submitted by a user.

Also, in another embodiment, one or more of the parameters may be weighted when determining the risk. For example, a parameter determined to be more important with respect to the risk associated with the entity (e.g., a scope of the access, access to particular data, unique access, etc.) may be weighted higher than a parameter determined to be less important with respect to the risk when determining the risk. In another example, different combinations of parameters may be assigned different weights. In still another example, one or more of the parameters associated with a particular item of data (e.g., confidential data, sensitive data, private data, etc.) may be weighted higher than parameters associated with other items of data. In yet another embodiment, the one or more parameters may be weighted by an administrator of the system, a user of the system, a customer of the system, etc.

Additionally, in one embodiment, the risk associated with the entity may be determined by comparing the one or more parameters against one or more predetermined rules. For example, if one or more of the parameters match one or more of the predefined rules, a particular risk may be assigned to the entity. In another embodiment, one or more of the rules may be generated by an administrator of the system, a user of the system, a customer of the system, etc. For example, a customer of the system may generate their own rules on specific data types based on internal requirements, such as confidential information, protected health information, sensitive customer data, etc.

Also, in one embodiment, the determining may take into account one or more data sharing rules as well as assigned privileges. For example, if an entity has access to all data within a system based upon a global sharing rule, the risk associated with the entity may be the same as if the entity had a global privilege to view all data in the system.

Further, in yet another embodiment, the risk associated with the entity may include the risk that the entity will perform an action determined to be undesirable associated with one or more elements of the data. For example, the risk may include a risk that the entity will steal the data, alter the data, disclose the data (e.g., to one or more unauthorized entities, etc.), remove/delete the data, utilize the data to perform one or more undesired acts (e.g., insider trading, fraud, etc.), etc.

In still another embodiment, one or more of the undesirable actions may influence the determining of the risk associated with the entity. For example, one or more of the parameters that are determined to be associated with one or more of the undesirable actions to be prevented may be weighted more heavily than parameters that are determined not to be associated with the one or more undesirable actions. In yet another embodiment, one or more of the undesirable actions may be selected by an administrator of the system, a user of the system, a customer of the system, etc., and the parameters that are determined to be associated with the selected undesirable actions to be prevented may be weighted accordingly.

Further still, as shown in operation 106, one or more actions are performed, utilizing the risk associated with the entity. In one embodiment, the risk score of the entity may be provided to a client, user, administrator, etc. For example, a summary of risk scores of entities within a system may be provided to the client. In another embodiment, the entity may be monitored, based on the risk. For example, the risk score of the entity may be compared against a threshold risk score level, and if the risk score of the entity is higher than the threshold, the entity may be monitored (e.g., by an anti-malware program, a system administrator, a client, etc.). In yet another embodiment, the threshold risk score level may be a default value, may be determined by a system administrator, a client, etc.

Also, in another embodiment, one or more logs associated with the entity may be provided to the client, user, administrator, etc. For example, the risk score of the entity may be compared against a threshold risk score level, and if the risk score of the entity is higher than the threshold, one or more activity logs associated with the entity may be provided to the client. In this way, only the activity logs of entities determined to be of a particular risk level may be sent.

In yet another embodiment, the risk associated with the entity may be analyzed in association with one or more current actions of the entity, and one or more actions may be performed based on the analysis. For example, the risk score may be periodically determined and sent to a fraud monitoring and/or fraud prevention application that determines high-risk entities and performs a real-time observation of those entities. In another embodiment, if the application determines that an entity having a particular risk score performs one or more actions determined to be significant, the application may detect the actions, prevent the actions, record the actions, create an alert, create a report (e.g., an activity log of riskiest users, etc.), etc. Also, the risk associated with the entity may be input into a software element or any other program.

In addition, in one embodiment, the risk associated with the entity may be determined during multiple instances over a period of time, and a report may be generated (e.g., for delivery to a client, etc.) that illustrates changes in the risk over the time period. In this way, the client may be able to track risk levels for one or more entities over time, view evolution of risk over time, etc.

In this way, the risk associated with the entity may be determined from a data loss perspective. Additionally, an entity may be determined to be risky based upon a variety of factors including access rights granted to the entity. Further, the risk associated with the entity may provide an important competitive advantage when used for one or more functions. Further still, value may be added to analyses that utilize the determined risk, since they may focus their resources on more relevant entities according to such risk. For example, only entities deemed risky based on their associated risk may be monitored on the system by an application (e.g., a malware application, a security application, etc.), thereby saving time and energy.

In addition, user identification of risk may be enabled in systems where such identification may have previously been difficult. For example, in an on-demand multi-tenant database system or other cloud computing system, a client may be able to identify the risk score of the entity without having to access logs associated with the entity or by otherwise monitoring the entity.

Figure 2:
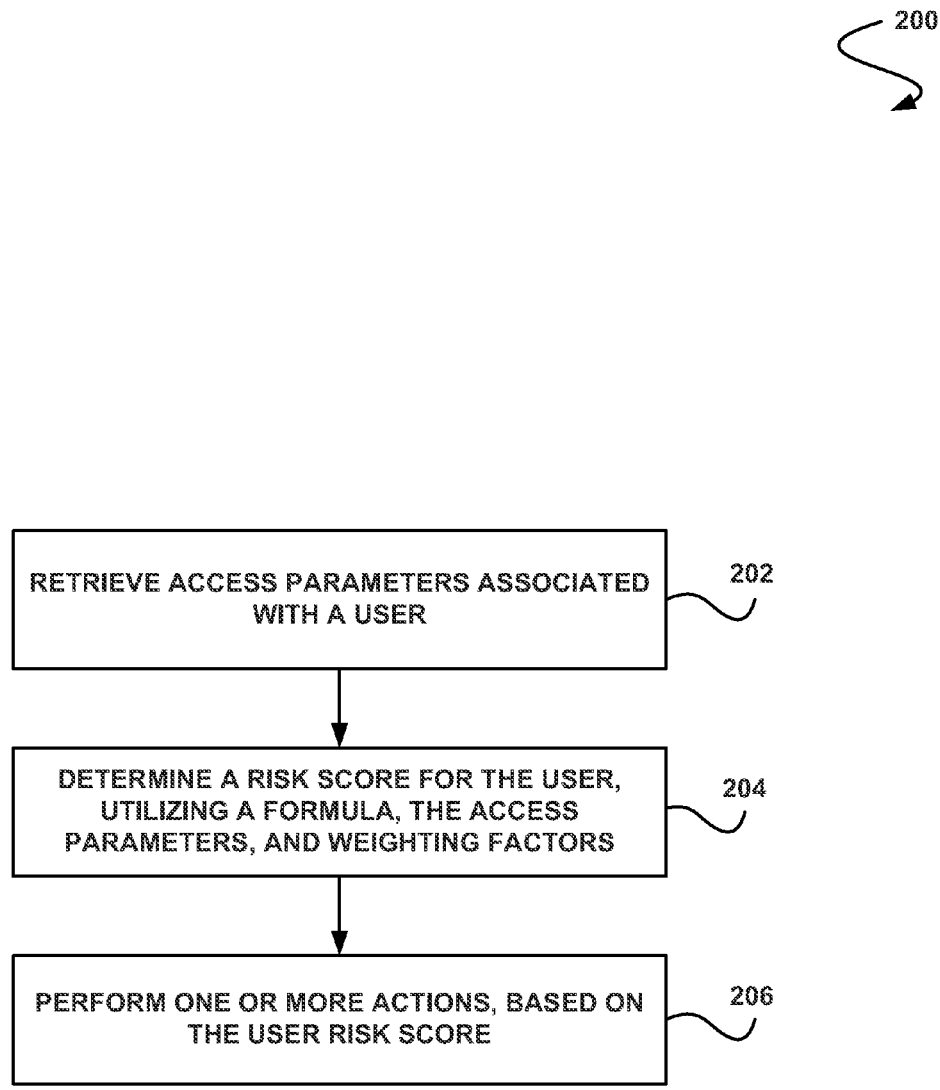
FIG. 2 illustrates a method for performing one or more actions based on a user risk score, in accordance with another embodiment.

FIG. 2 illustrates a method 200 for performing one or more actions based on a user risk score, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, access parameters associated with a user are retrieved. Additionally, as shown in operation 204, a risk score is determined for the user, utilizing a formula, the access parameters, and weighting factors. In one embodiment, the actual formula itself may have many possible implementations. In another embodiment, a background process may recalculate the formula based upon changes or nightly if performance impact of doing it real-time.

Table 1 illustrates an exemplary risk score formula. Of course, it should be noted that the formula shown in Table 1 is set forth for illustrative purposes only, and thus should not be construed as limiting in any manner. In another embodiment, additional formulas may vary in terms of which parameters are used and/or the weights used. In another embodiment, each parameter may have a weighting factor associated with it.

TABLE 1

| Score = u1 * w1 + u2 * w2 + u3 * w3 + u4 * w4 |
| --- |

Where w1 + w2 + w3 + w4 = 1

In one embodiment, the first weighting factor (u1) may be calculated from several permissions assigned to the user. In another embodiment, u1 may be normalized such that the range of possible scores is between 0 and 100. In yet another embodiment, the user may be assigned points for one or more permissions. Table 2 illustrates exemplary permissions assigned to the user. Of course, it should be noted that the permissions shown in Table 2 are set forth for illustrative purposes only, and thus should not be construed as limiting in any manner.

TABLE 2

| Permission | Points |
|---|---|
| Modify All Data | 60 |
| View All Data | 40 |
| Manage Users | 50 |
| Customize Application | 40 |
| Author Apex | 40 |
| Manage Dashboards | 20 |
| Transfer Record | 20 |
| View All Forecasts | 30 |
| View Encrypted Data | 30 |
| Weekly Data Export | 50 |
| Others . . . | |

In another embodiment, the user may be allowed to define additional parameters for permissions that are important to their organization. For example, the total score u1 may be calculated whenever the user's profile changes and these privileges are added or removed. In yet another embodiment, another parameter may be calculated from security settings configured for the user. These can include: password settings (e.g., expiration time, password complexity, password minimum length, lockout period for failed logins, etc.), session settings (idle session timeout, requiring secure connections (HTTPS), etc.), login and authentication restrictions (e.g., time of day the user can login, IP addresses from which the user can log in, etc.), etc.

Additionally, in one embodiment, the system may have a concept of sharing. For example, sharing may include various levels of rules that determine whether or not a user has access to view or modify a particular object. Each object type (e.g., contact, lead, account, etc. . . . ) may have a different default setting. In one embodiment, if the default sharing settings are private, then no users may see data owned by other users. This private setting may be overwritten by a sharing rule that grants permissions based upon various criteria such as role (e.g., ceo, salesperson, territory, etc.) or arbitrary groups of users.

In another embodiment, another risk scoring factor may be calculated from these sharing settings. For example, one possible approach may be to use the number records shared to a user as the figure of merit. This data may be recalculated by the system when the rules change, and may be saved in database tables that can be easily queried. In yet another embodiment, a simple formula may be used for each object type (e.g., contact, lead, account, etc.) independently. For example, the formula may start with the number of records shared to the user divided by the total number records for that object type. This ratio may be calculated for each object type and may be weighted by the relative importance of each object compared to the others.

Further, in another embodiment, a user, customer, etc. may also be able to define their own parameters via a rules-based approach. For example, suppose a customer created a custom field that allowed for 5 different options that represented sensitivity. A user may be able to define a formula (using Apex or existing formula languages already in the system) that returns a numeric value. Additionally, see, for example, "Salesforce CRM Security Audit Guide," (04/2009), which is hereby incorporated by reference in its entirety, and which describes additional exemplary descriptions of sharing and other settings.

Further still, as shown in operation 206, one or more actions are performed, based on the user risk score. In one embodiment, alerts for actions performed by the riskiest users may be generated. In another embodiment, log data may be sent for users with risk scores above a certain level. In yet another embodiment, overall aggregate trending of user risk score may be reported to show compliance improvements. In still another embodiment, reporting may be shown on users whose risk scores are improving or worsening. Also, in one embodiment, every user may have a score that is maintained and a daily or periodic history may be saved for future reporting, trending, alerting to changes, or other uses.

System Overview

Figure 3:
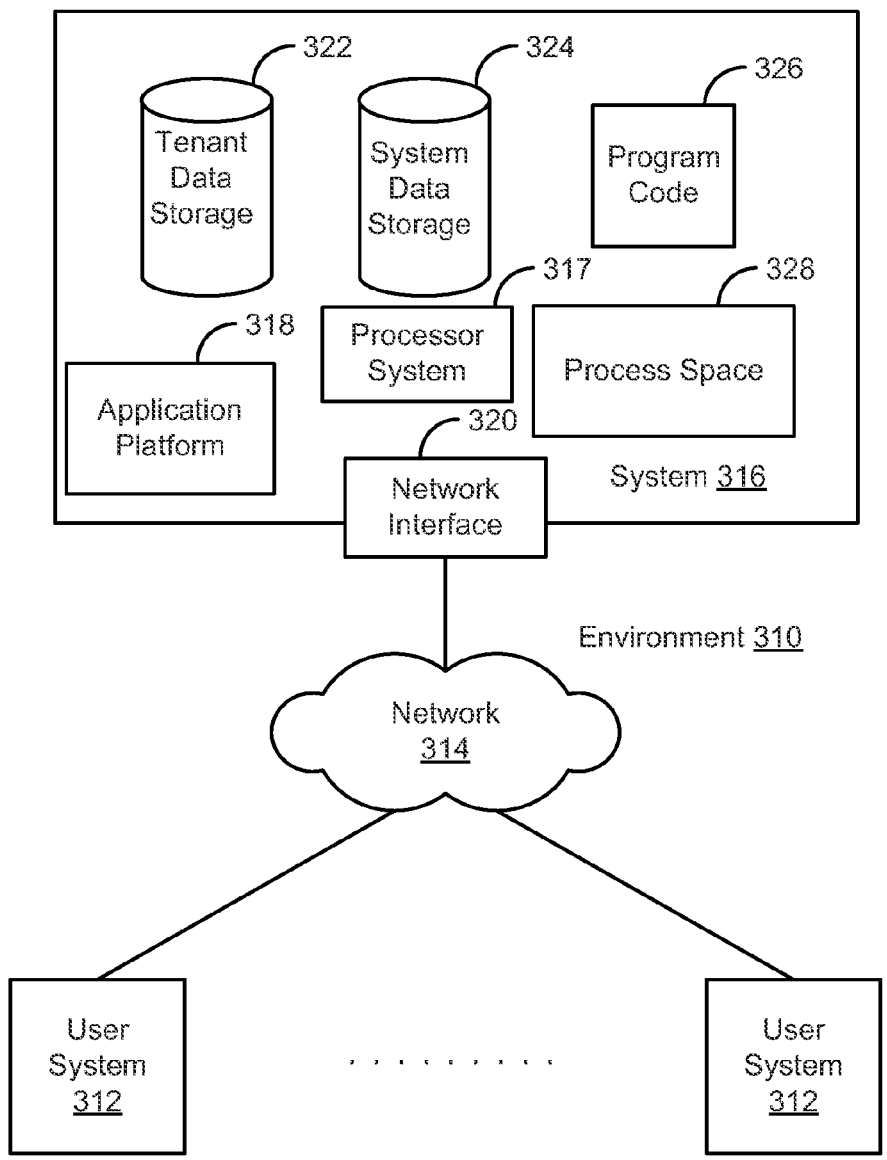
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 10 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
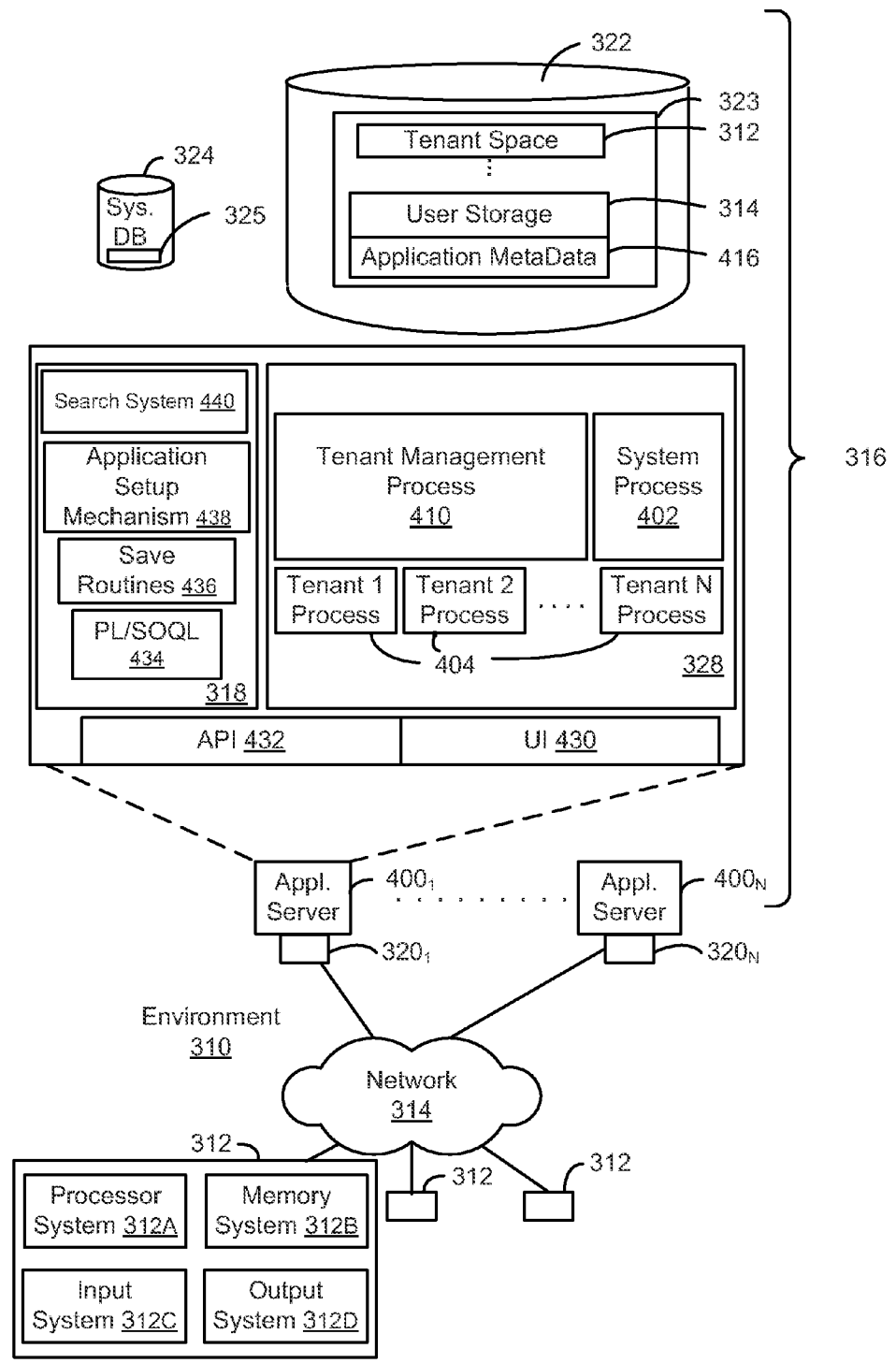
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers 400$_1$-400$_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server 400$_1$ might be coupled via the network 314 (e.g., the Internet), another application server 400$_{N-1}$ might be coupled via a direct network link, and another application server 400$_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code being executable by a computer to perform operations, the operations comprising:

identifying by a system a plurality of parameters associated with an entity's access to system data, where the plurality of parameters includes a data sharing rule assigned to the entity that enables the entity to create and grant specific system data access to another entity, the specific system data access including access to one or more elements of the system data;

determining by the system a selection of one of a plurality of algorithms, where each of the plurality of algorithms is used to determine a risk score for the entity in accordance with a plurality of predetermined categories of risk, wherein the plurality of predetermined categories of risk includes one or more of: data loss by the system in association with the entity, data theft by the entity, or insider trading by the entity;

determining by the system a predetermined number of points assigned to each of the plurality of parameters according to the selected algorithm, determining by the system a plurality of weighted numbers respectively corresponding to the plurality of parameters, wherein determining a given one of the weighted numbers respectively corresponding to a given one of the parameters includes multiplying the predetermined number of points assigned to the given parameter by a weight associated with the given parameter by the selected algorithm, determining by the system the risk score for the entity by summing the weighted numbers respectively corresponding to the plurality of parameters;

identifying by the system that the entity is attempting to perform one or more actions within the system; and preventing by the system the performance of the one or more actions when the system determines that the risk score for the entity is higher than a predetermined threshold.

2. The computer program product of claim 1, wherein the plurality of parameters include a location of the entity.

3. The computer program product of claim 1, wherein the plurality of parameters include a history of actions taken by the entity within the system.

4. The computer program product of claim 1, wherein the plurality of parameters include a login history of the entity.

5. The computer program product of claim 1, wherein the plurality of parameters include a data access history of the entity.

6. The computer program product of claim 1, wherein the computer program product is operable to further determine the risk score for the entity by comparing the plurality of parameters against one or more predetermined rules.

7. The computer program product of claim 1, wherein the risk score for the entity indicates a risk that the entity will perform an action determined to be undesirable with respect to one or more elements of the system data.

8. The computer program product of claim 1, wherein the computer program product is operable to provide the risk score for the entity to a client.

9. The computer program product of claim 1, wherein the computer program product is operable to compare the risk score for the entity against another a different threshold than the predetermined threshold, and if the risk score of the entity is higher than the different threshold, the entity is monitored.

10. The computer program product of claim 1, wherein the computer program product is operable to determine the risk score for the entity during multiple instances over a period of time, and to generate a report that illustrates changes in the risk score over the time period.

11. The computer program product of claim 1, the operations further comprising determining the weight associated with the given parameter based at least in part upon whether the given parameter is determined to be associated with one or more undesirable actions.

12. The computer program product of claim 1, wherein the plurality of predetermined categories of risk includes data theft and insider trading.

13. The computer program product of claim 11, wherein the one or more undesirable actions are selected by a user.

14. The computer program product of claim 1, wherein the system data includes an indication of one or more types of files within the system that the entity is allowed to access.

15. The computer program product of claim 1, wherein the plurality of parameters include one or more permissions granted to the entity that expire after a predetermined amount of time or after a predetermined amount of access has been performed.

16. A method, comprising:

identifying by a system a plurality of parameters associated with an entity's access to system data, where the plurality of parameters includes a data sharing rule assigned to the entity that enables the entity to create and grant specific system data access to another entity, the specific system data access including access to one or more elements of the system data;

determining by the system a selection of one of a plurality of algorithms, where each of the plurality of algorithms is used to determine a risk score for the entity in accordance with a plurality of predetermined categories of risk, wherein the plurality of predetermined categories of risk includes one or more of: data loss by the system in association with the entity, data theft by the entity, or insider trading by the entity;

determining by the system a predetermined number of points assigned to each of the plurality of parameters according to the selected algorithm, determining by the system a plurality of weighted numbers respectively corresponding to the plurality of parameters, wherein determining a given one of the weight numbers respectively corresponding to a given one of the parameters includes multiplying the predetermined number of points assigned to the given parameter by a weight associated with the given parameter by the selected algorithm, determining by the system the risk score for the entity by summing the weighted numbers respectively corresponding to the plurality of parameters;

identifying by the system that the entity is attempting to perform one or more actions within the system; and preventing by the system the performance of the one or more actions when the system determines that the risk score for the entity is higher than a predetermined threshold.

17. A system, comprising:

a hardware processor; and a memory that stores instructions, wherein the instructions are executable by the hardware processor to perform operations comprising:

identifying by the system a plurality of parameters associated with an entity's access to system data, where the plurality of parameters includes a data sharing rule assigned to the entity that enables the entity to create and grant specific system data access to another entity, the specific system data access including access to one or more elements of the system data;

determining by the system a selection of one of a plurality of algorithms, where each of the plurality of algorithms is used to determine a risk score for the entity in accordance with a plurality of predetermined categories of risk, wherein the plurality of predetermined categories of risk includes one or more of: data loss by the system in association with the entity, data theft by the entity, or insider trading by the entity;

determining by the system a predetermined number of points assigned to each of the plurality of parameters according to the selected algorithm, determining by the system a plurality of weighted numbers respectively corresponding to the plurality of parameters, wherein determining a given one of the weighted numbers respectively corresponding to a given one of the parameters includes multiplying the predetermined number of points assigned to the given parameter by a weight associated with the given parameter by the selected algorithm, determining by the system the risk score for the entity by summing the weighted numbers respectively corresponding to the plurality of parameters;
identifying by the system that the entity is attempting to perform one or more actions within the system; and
preventing by the system the performance of the one or more actions when the system determines that the risk score for the entity is higher than a predetermined threshold.

\* \* \* \* \*